United States Patent [19]

Johnson

[11] Patent Number: 5,504,428
[45] Date of Patent: Apr. 2, 1996

[54] MAGNETIC METAL DETECTOR MOUNTED IN A FEED ROLL OF A HARRISTING MACHINE

[75] Inventor: Stanley J. Johnson, Cedar Falls, Iowa

[73] Assignee: Deere & Company, Moline, Ill.

[21] Appl. No.: 311,161

[22] Filed: Sep. 16, 1994

[51] Int. Cl.⁶ .................... G01R 33/12; G08B 21/00; A01D 75/18; A01D 75/28
[52] U.S. Cl. ............................................ 324/243; 324/226
[58] Field of Search ................................. 324/239, 240, 324/241, 243, 207.11, 207.14, 207.15, 207.22, 226, 262; 56/10.2

[56] References Cited

U.S. PATENT DOCUMENTS

| | | |
|---|---|---|
| 2,550,736 | 5/1951 | Tricebock . |
| 3,757,501 | 9/1973 | Bennett, Jr. et al. . |
| 3,889,249 | 6/1975 | Bennett, Jr. et al. . |
| 3,964,042 | 6/1976 | Garrott . |
| 3,972,156 | 8/1976 | Bennett, Jr. et al. . |
| 4,344,074 | 8/1982 | Strosser et al. . |
| 4,433,528 | 2/1984 | Bohman . |
| 4,758,788 | 7/1988 | Weiss et al. ............................ 324/243 |
| 4,785,243 | 11/1988 | Abramczyk et al. .................... 324/242 |
| 4,788,813 | 12/1988 | Strosser et al. . |
| 5,187,723 | 2/1993 | Mueller-Stuercken . |
| 5,343,676 | 9/1994 | Weiss . |

FOREIGN PATENT DOCUMENTS 0546509  6/1993  Germany .

*Primary Examiner*—Walter E. Snow

[57] ABSTRACT

A metal detector has three magnet/coil units positioned end-to-end. Each magnet/coil unit has a generally rectangular bobbin supporting a coil and a pair of bar magnets at opposite ends thereof. The three coils are connected electrically in a three-phase "Y" configuration. The voltages generated by all three coils are received by a microprocessor-based signal processing unit (SPU). The SPU generates a three difference signals $V(x-y)$, $V(y-z)$ and $V(z-x)$ which represent the differences between the individual coil voltages. The SPU generates a sum signal representing a sum of the absolute values of all the difference signals and generates a trip signal if the sum signal is greater than a threshold. The SPU determines over which side of the coil assembly the piece of metal passes by comparing to a threshold the difference signal corresponding to a difference between the voltages from the coils at opposite ends of the coil assembly. The SPU more precisely determines the position of the piece of metal by comparing the difference signals to each other.

18 Claims, 7 Drawing Sheets

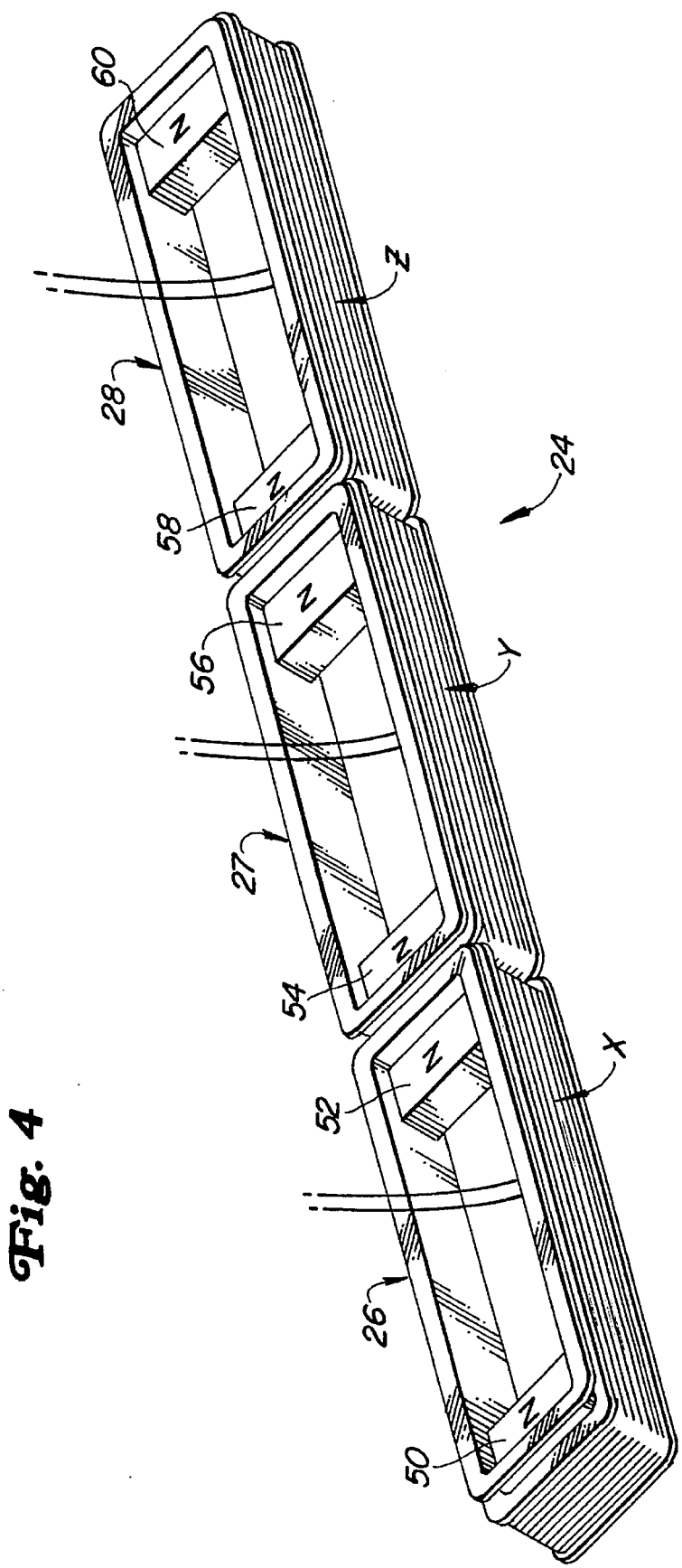

Fig. 6
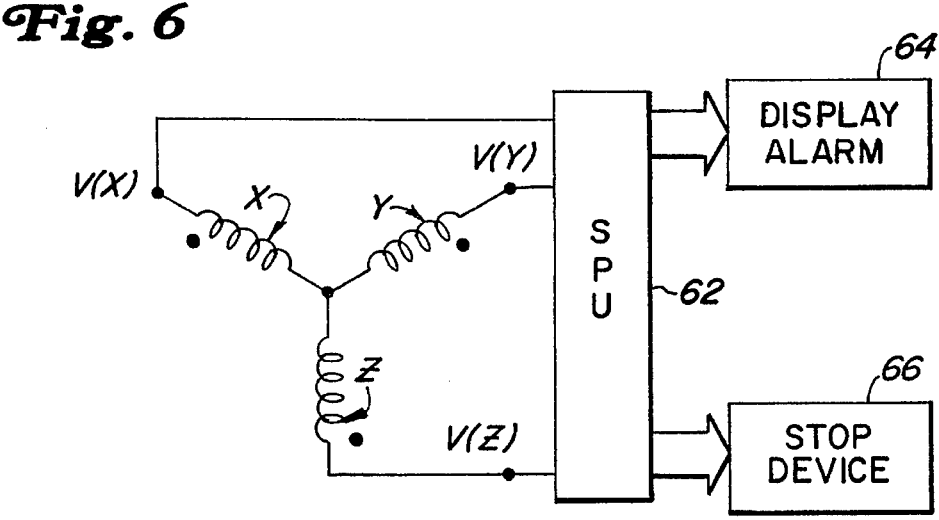
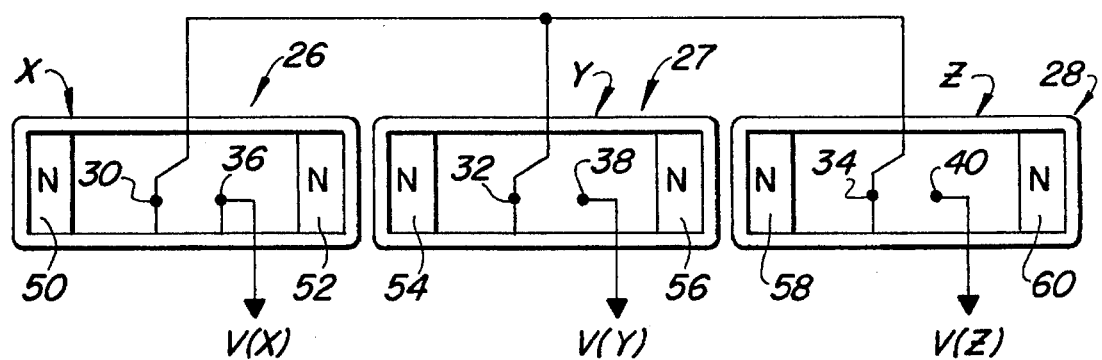
Fig. 5

MAGNETIC METAL DETECTOR MOUNTED IN A FEED ROLL OF A HARRISTING MACHINE

BACKGROUND OF THE INVENTION

The invention relates to a metal detector for detecting the presence of metal in crop material being fed into a forage harvester, and particularly, to such a metal detector having a magnetic field through which crop material passes and a pickup coils for generating a signal in response to metal passing through the magnetic field.

It is known to use a magnet and coil type detector to sense metal particles in crop material in a forage harvester to protect the cutterhead from damage and to protect livestock from ingesting pieces of metal. When the metal passes over the sensor, the metal detector stops the rotation of the feed rolls preventing the crop material containing the metal from reaching the cutterhead. For example, U.S. Pat. No. 3,972,156, issued 3 Aug. 1976 to Bennett, Jr. et al shows a forage harvester metal detector with a single conductor "figure-8" wire coil. However, such a coil may fail to detect metal which flows across the center of the magnet and coil assembly. Alternative designs are shown in U.S. Pat. No. 3,757,501, issued 11 Sep. 1973, and in U.S. Pat. No. 3,889,249, issued 10 Jun. 1975, both to Bennett, Jr. et al, wherein a forage harvester metal detector includes two separate staggered "figure-8" wire coils, each formed by a separate conductor. Such two-coil designs are expensive because they require more wire than is required by the single coil designs and because duplicate electronic circuits are required. All these prior art designs suffer from reduced sensitivity to metal which moves past the feed roll outside the outer ends of the detecting unit.

If a metal detector sensor is constructed using a single coil of wire, it will be very susceptible to stray magnetic fields such as those from overhead power lines. For this reason, the first successful metal detector sensors were constructed with two coils. The coils were wired so that voltages from a uniform field would be canceled. Using two coils connected in an opposing manner caused another problem, however. Metal crossing the sensor on a line bisecting the two coils could cause an equal voltage to be induced in each coil. The equal voltages would cancel each other leaving no signal to activate the metal detector. One metal detection system avoided this problem by using four coils and two sets of amplifiers. This solution is expensive and requires matched amplifiers to prevent the system from being more sensitive in some areas than other areas.

A metal detector system with three coils is described in EP patent application 546,509, published 16 Jun. 1993. However, in this system the three coils appear to be connected in a single phase series arrangement. Such a system is believed to be more sensitive in the middle than at its end. It would be desirable to have a metal detector which has a substantially uniform sensitivity.

In a multi-coil metal detector system it would be desirable for the operator to know over which of the coils did a triggering piece of metal pass. This would make it easier for the operator to locate the piece of metal and remove it from the feed rolls. However, none of the aforementioned multi-coil metal detection systems can provide such information.

SUMMARY OF THE INVENTION

Accordingly, an object of this invention is to provide a multi-coil metal detector which enables an operator to know over which of the coils did a triggering piece of metal pass.

A further object of the invention is to provide a metal detector which has a substantially uniform sensitivity.

These and other objects are achieved by the present invention wherein a metal detector has three magnet/coil units positioned end-to-end. Each magnet/coil unit has a generally rectangular bobbin supporting a coil and a pair of bar magnets at opposite ends thereof. The three coils are connected electrically in a three-phase "Y" configuration. The voltages generated by all three coils are received by a microprocessor-based signal processing unit (SPU). The SPU generates a three difference signals $V(x-y)$, $V(y-z)$ and $V(z-x)$ which represent the differences between the individual coil voltages. The SPU generates a sum signal representing a sum of the absolute values of all the difference signals and generates a trip signal if the sum signal is greater than a threshold. The SPU determines over which side of the coil assembly the piece of metal passes by comparing to a threshold the difference signal corresponding to a difference between the voltages from the coils at opposite ends of the coil assembly. The SPU more precisely determines the position of the piece of metal by comparing the difference signals to each other.

BRIEF DESCRIPTION OF THE DRAWINGS

FIG. 4 is a perspective view of the coil assembly portion of the metal detector of the present invention with the outer housing and potting removed for purposes of clarity;

FIG. 5 is a top schematic view of the coil assembly portion the metal detector of the present invention;

FIG. 6 is a simplified schematic block diagram showing the coils together with the electronic control unit of the present invention;

DETAILED DESCRIPTION

Figure 1:
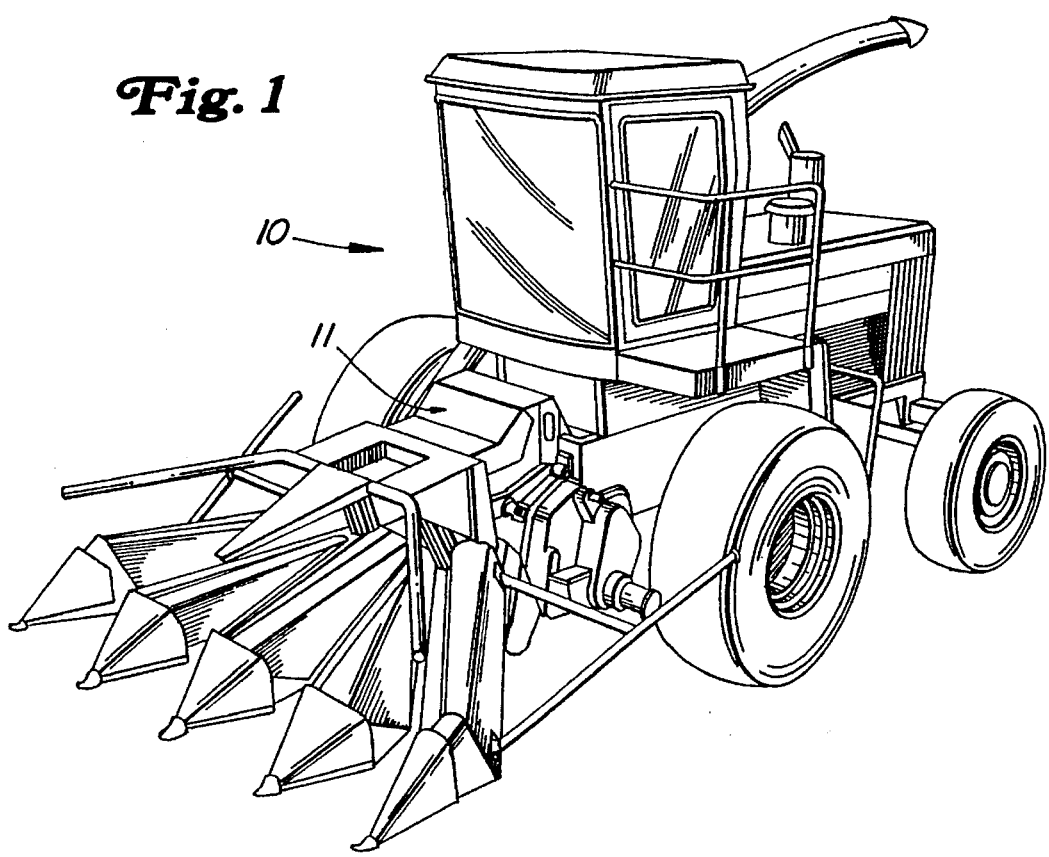
FIG. 1 is a perspective view of a forage harvester in which the present invention may be used.
Figure 2:
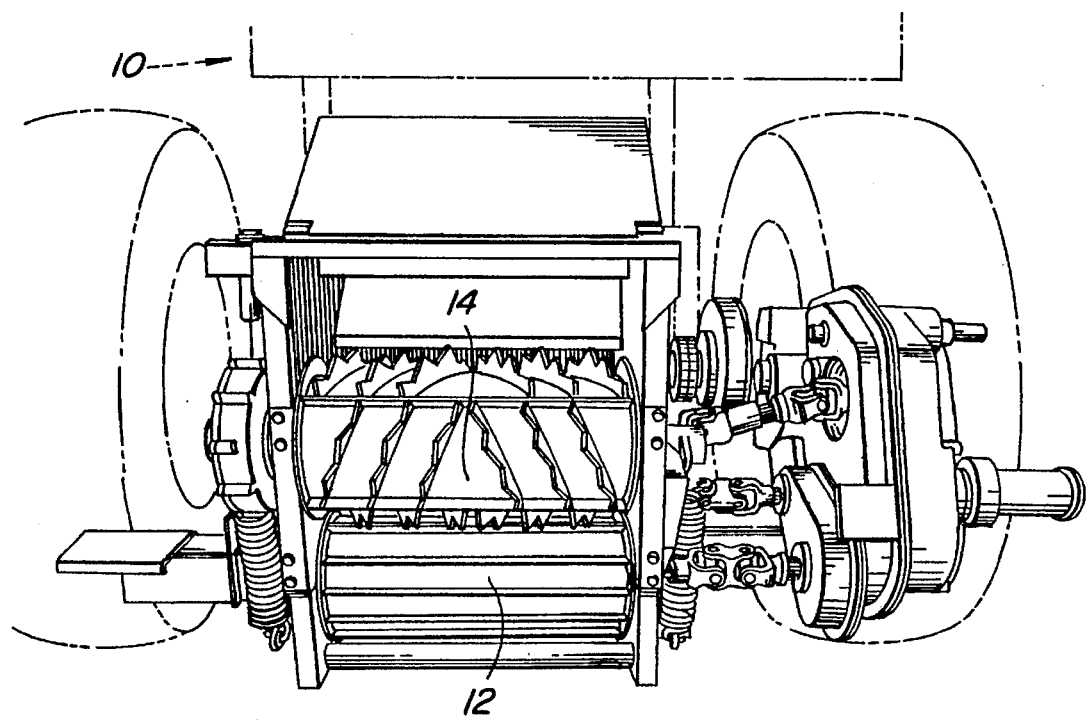
FIG. 2 is a front view showing the feed roll portions of a forage harvester which is the environment for which the present invention is intended.
Figure 3:
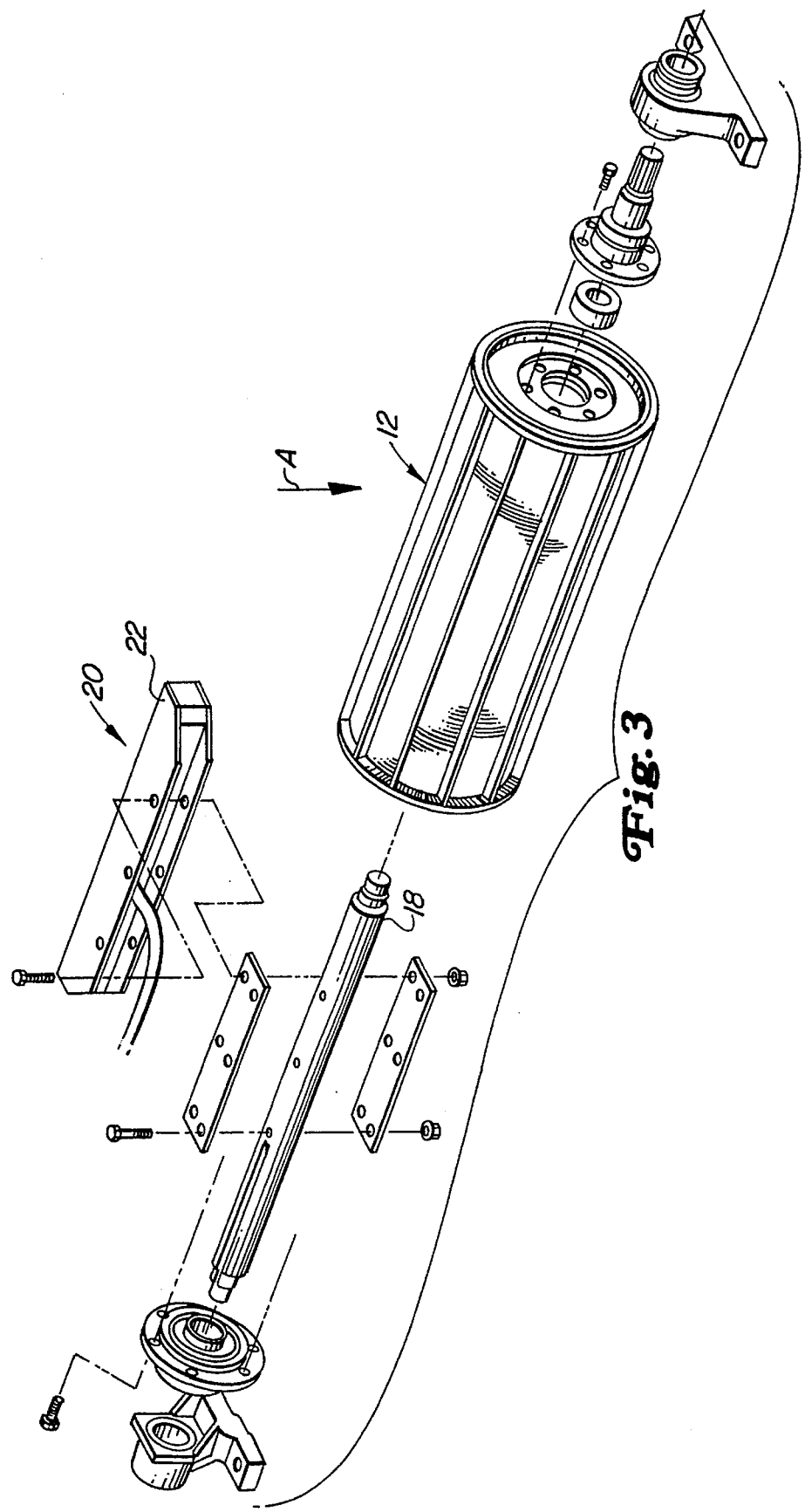
FIG. 3 is an exploded view showing the mounting of the metal detector of the present invention within a feed roll.

Referring to FIGS. 1 and 2, a forage harvester 10, includes a feeder portion 11 which has feed rolls 12 and 14 which rotate to direct crop material to the cutterhead (not shown) and the shear bar (not shown). As best seen in FIG. 3, feed roll 12 is mounted for rotation on a fixed shaft 18. Crop flows over the feed roll 12 in the direction indicated by arrow A which is perpendicular to the axis of shaft 18. A metal detector unit 20 includes an aluminum or non-ferrous housing 22 which is mounted inside the feed roll 12 on the shaft 18. The structure described so far is conventional and is available as an option for commercially available forage harvesters.

Turning now to FIG. 4 and 5, the assembly 24 which is enclosed in the housing 22 preferably includes a three identical bobbins 26, 27 and 28 which are positioned generally end-to-end with their long dimension oriented parallel to the axis of rotation of feed roll 12 and transverse to the direction of material flow through the flow path. Separate conductors are wrapped around each of the bobbins 26, 27 and 28 to form three coils X, Y and Z, respectively. Coils X, Y and Z have respective common terminals 30, 32 and 34 which are connected together and respective output terminals 36, 38 and 40. Viewing FIG. 5, the conductor is preferably wrapped a 1000 turns in a clockwise manner from each common terminal to the corresponding output terminal.

Each bobbin holds a set of rectangular bar magnets. For example, a pair of magnets 50 and 52 are mounted inside and at opposite ends of bobbin 26. A pair of magnets 54 and 56 are mounted inside and at opposite ends of bobbin 27. A pair of magnets 58 and 60 are mounted inside and at opposite ends of bobbin 28. The assembly 24 is mounted in the housing 22 and is preferably "potted" with epoxy resin such as "EPOXIDHARZ" potting epoxy.

All the magnets 50–60 have their north poles N oriented in the same direction, generally upward viewing FIG. 4 and out of the paper viewing FIG. 5, so that the magnetic field lines therefrom (not shown) will extend past the outer surface of the feed roll 12 and into the material flow path. This arrangement of magnets concentrates the magnet field at the ends of the coils and reduces the field in the center, thus producing a substantially uniform field between the ends of the coils. The magnetic field from magnet 54 partially adds to the magnetic field from magnet 52, and the same is true for magnets 56 and 58. If the same size or strength magnets were used in all six locations, the combined magnetic field will be larger in the center than at either end. To correct for this, and produce a more uniform field, magnet 50 at the outer end of coil X and magnet 60 at the outer end of coil Z are preferably 50% larger or stronger than the magnets 52–58.

Referring now to FIG. 6, the coils X, Y and Z are connected together in a three-phase "Y" manner. The coils X, Y and Z will generate at their output terminals 36, 38 and 40, voltage signal V(x), V(y) and V(z), respectively, in response to metal passing through the magnetic field produced by the magnets 50–60. These voltage signals are connected to a signal processing unit (SPU) 62 which controls a display and/or alarm unit 64 and a conventional stop mechanism 66 which is tripped to stop rotation of the feed rolls 12 and 14.

Figure 7:
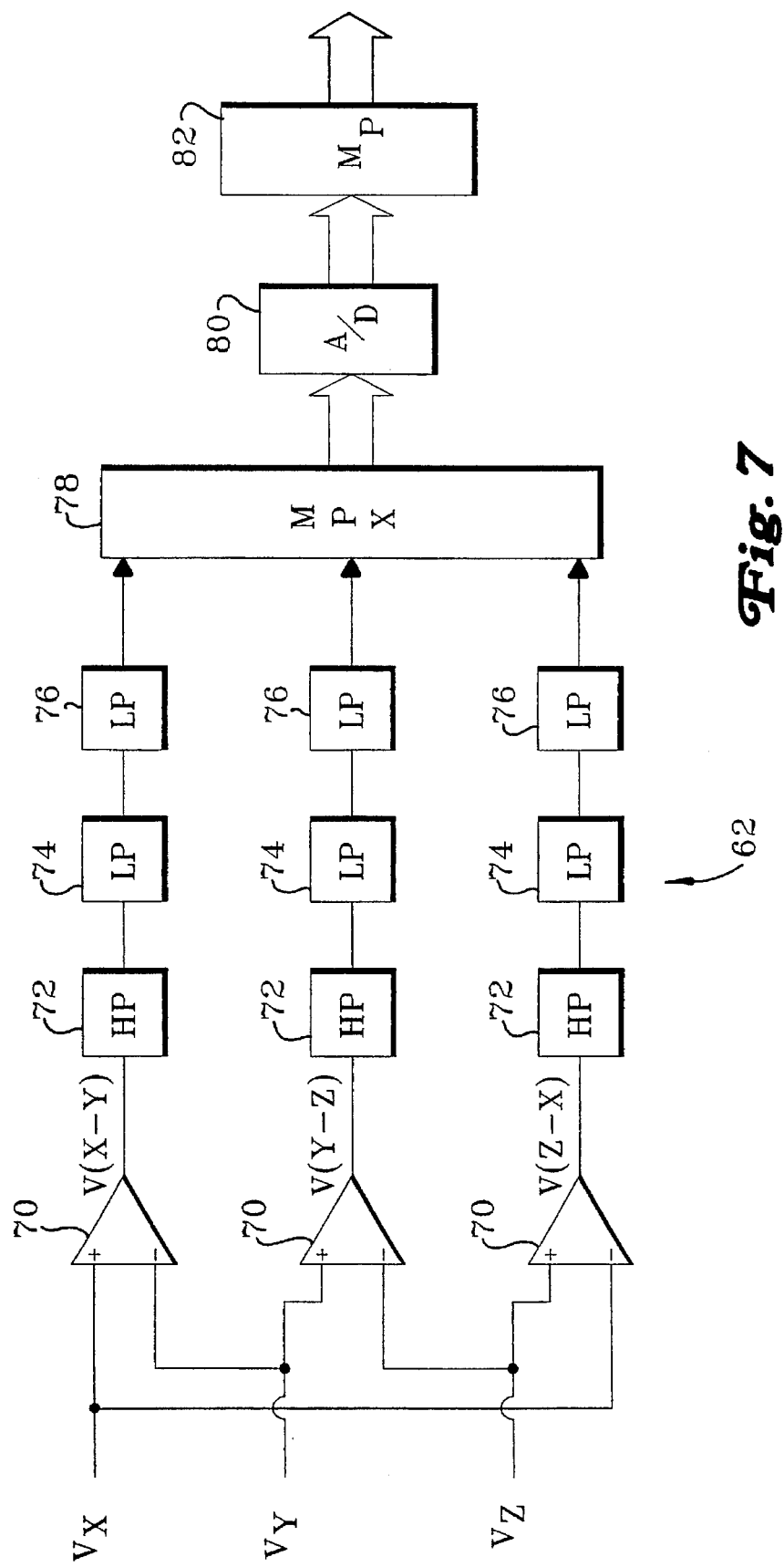
FIG. 7 is a schematic block diagram of the electronic signal processing unit of the present invention.

Referring now to FIG. 7, the SPU 62 includes three differential amplifiers 70 with gains of approximately 83 which generate difference signals V(X–Y) representing a difference between V(x) and V(y), V(Y–Z) representing a difference between V(Y) and V(Z) and V(Z–X) representing a difference between V(Z) and V(X). The outputs of differential amplifiers 70 are received by 1 Hertz high pass filters 72, 30 Hertz low pass filters 74 with gains of approximately 3 and 35 Hertz low pass filters 76 with gains of approximately 6.65. The outputs of low pass filters 76 are received by a conventional multiplexer 78. A conventional analog-to-digital converter 80 couples the multiplexer 78 to a conventional microprocessor 82.

Figure 8A:
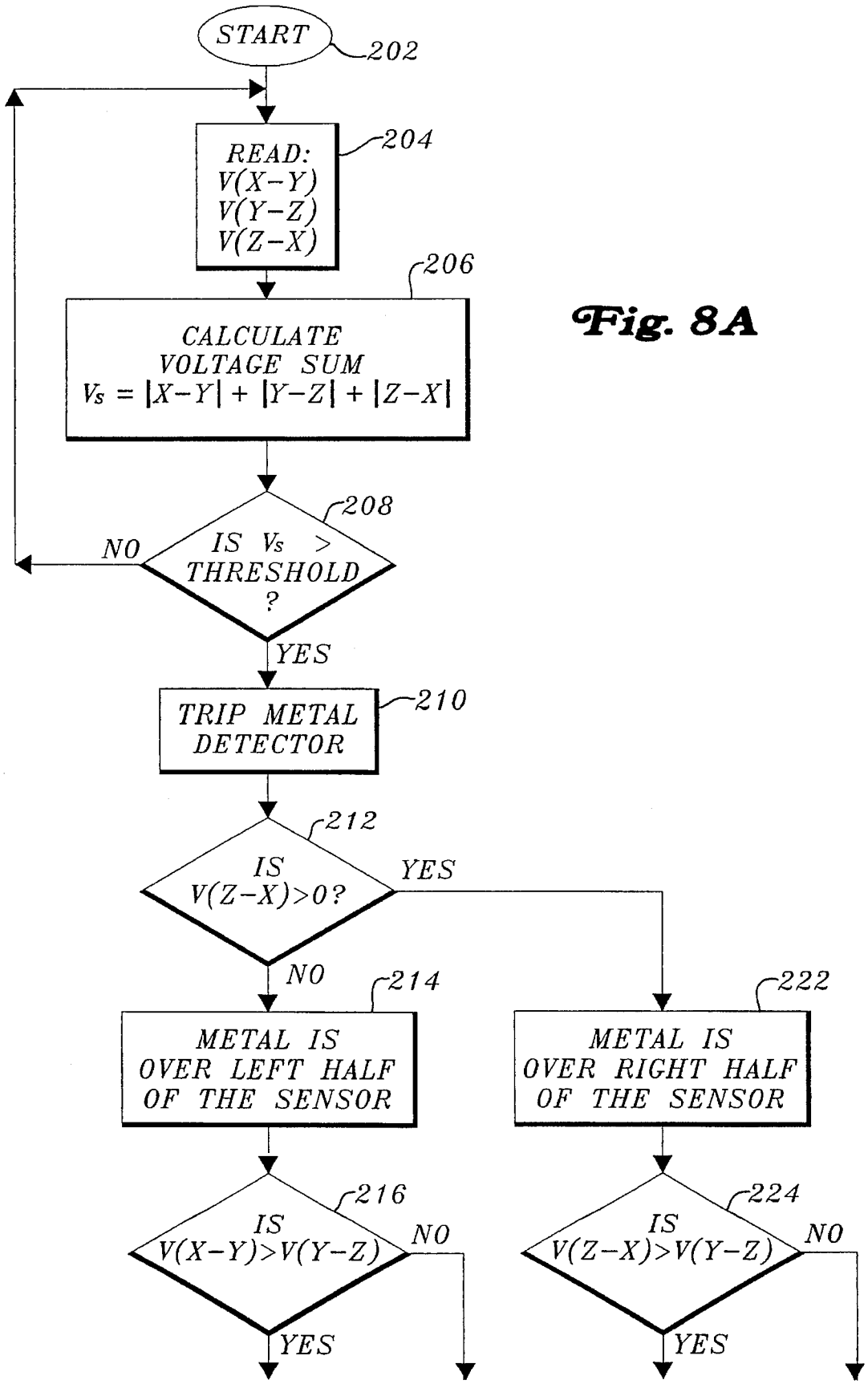
FIGS. 8a and 8b form a logic flow diagram of an algorithm executed by a microprocessor of the signal processing unit of the present invention.
Figure 8B:
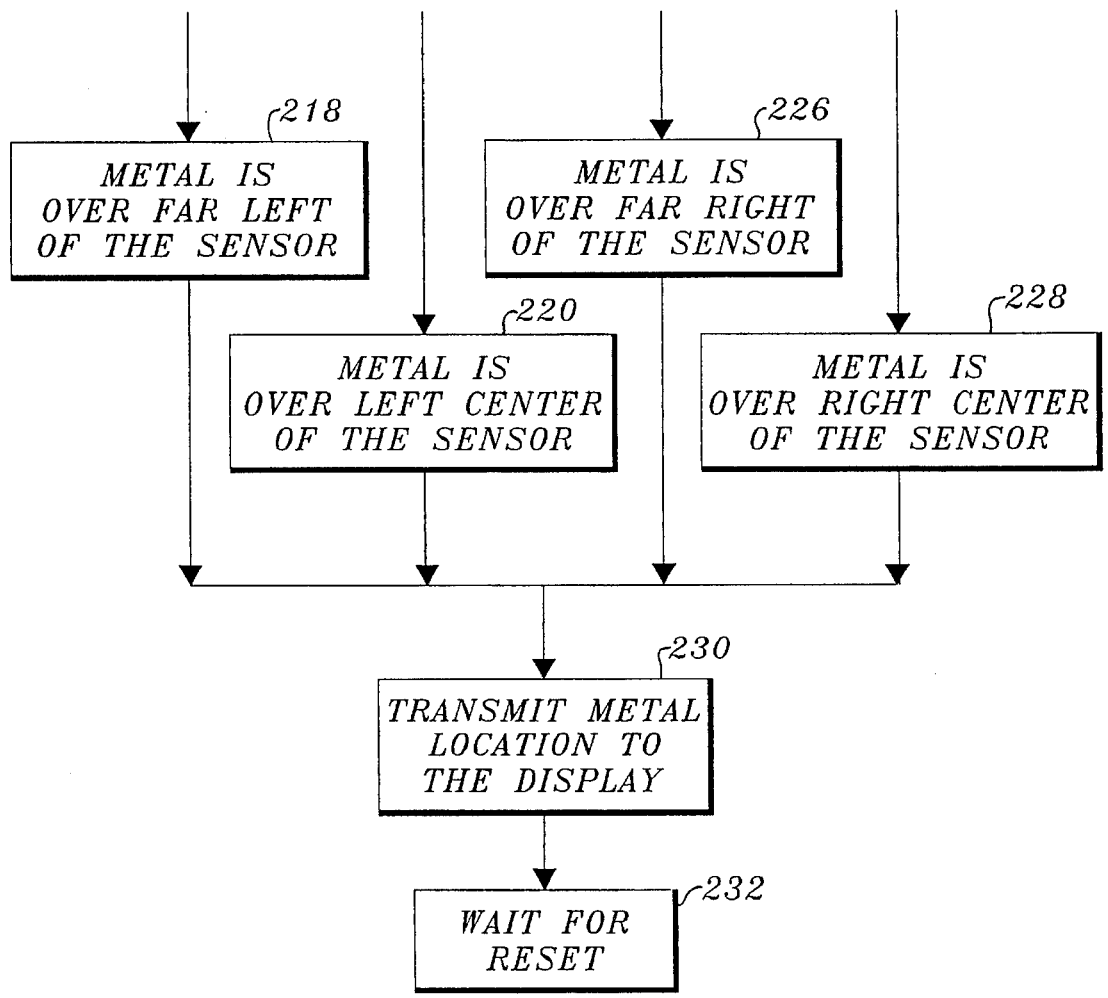

The microprocessor 82 executes an algorithm 200 represented by the flow chart of FIGS. 8a and 8b. The conversion of the flow chart 200 into a standard language for implementing the algorithm described by the flow chart in a digital computer or microprocessor, will be evident to one with ordinary skill in the art. The algorithm begins at step 202. In step 204 the difference voltages V(X–Y), V(Y–Z) and V(Z–X) from the outputs of SPU 62 are read. In step 206 a voltage sum Vs is calculated as the sum of the absolute values of V(X–Y), V(Y–Z) and V(Z–X). In step 208 if Vs is not greater than an adjustable, programmable threshold of, for example 0.7 volts, then the algorithm returns to step 204. If Vs is greater than the threshold, then the algorithm proceeds to step 210 which actuates the stop device 66. Thus, the absolute values of the difference signals are be added together, and the sum is compared to a predetermined level to determine if a piece of metal is present anywhere over the coil assembly 24, and if so, the stop device 66 is tripped to stop rotation of the feed rolls 12 and 14.

The algorithm then proceeds to step 212 which compares V(Z–X) to 0 volts. If V(Z–X) is not greater than 0 volts, then it means that metal has been detected somewhere over the left half of the coil assembly 24, step 214 generates and stores an appropriate signal and the algorithm proceeds to step 216. If V(Z–X) is greater than 0 volts, then it means that metal has been detected somewhere over the right half of the coil assembly 24, step 222 generates and stores an appropriate signal and the algorithm proceeds to step 224. Thus, steps 212, 214 and 222 operate to determine that the piece of metal has passed over one side or the other of the coil assembly 24 by comparing to zero the difference signal V(Z–X) corresponding to a difference between the voltages V(x) and V(z) from non-adjacent coils X and Z. In other words, steps 212, 214 and 222 operate to determine that the piece of metal has passed over one side or the other of the coil assembly 24 by comparing to a threshold the difference signal corresponding to a difference between the voltages from coils X and Z at opposite ends of the coil assembly 24.

Step 216 compares V(X–Y) to V(Y–Z). If V(X–Y) is greater than V(Y–Z), then it means that metal has been detected somewhere over the far left portion of the coil assembly 24, step 218 generates and stores an appropriate signal and the algorithm proceeds to step 230 which displays a message to that effect on display 64. Then step 232 causes the algorithm to wait for a reset signal.

Returning to step 216, if V(X–Y) is not greater than V(Y–Z), then it means that metal has been detected somewhere over the left center portion of the coil assembly 24, step 220 generates and stores an appropriate signal and the algorithm proceeds to step 230 which displays a message to that effect on display 64. Then step 232 causes the algorithm to wait for a reset signal.

Step 224 compares V(Z–X) to V(Y–Z). If V(Z–X) is greater than V(Y–Z), then it means that metal has been detected somewhere over the far right portion of the coil assembly 24, step 226 generates and stores an appropriate signal and the algorithm proceeds to step 230 which displays a message to that effect on display 64. Then step 232 causes the algorithm to wait for a reset signal.

Returning to step 224, if V(Z–X) is not greater than V(Y–Z), then it means that metal has been detected somewhere over the right center portion of the coil assembly 24, step 228 generates and stores an appropriate signal and the algorithm proceeds to step 230 which displays a message to that effect on display 64. Then step 232 causes the algorithm to wait for a reset signal.

Thus, the algorithm 200 analyzes the signals from the coils X, Y and Z and determines the presence or absence of metal and if metal is present, determines the approximate position of the metal in relationship to the coil assembly.

While the present invention has been described in conjunction with a specific embodiment, it is understood that many alternatives, modifications and variations will be apparent to those skilled in the art in light of the foregoing description. For example, greater lateral positional accuracy could be achieved by having a greater number of smaller coil and magnet units. Accordingly, this invention is intended to embrace all such alternatives, modifications and variations which fall within the spirit and scope of the appended claims.

I claim:

1. In a metal detector for sensing presence of metal in material flowing past rotatable machine elements in a harvesting machine, the metal detector being mounted inside a rotating feed roll of the harvesting machine, the metal detector having magnets for generating a magnetic field which extends into a path of the material, a sensing coil assembly for generating electrical signals when the magnetic field is altered by the presence of a piece of metal, a signal processing unit (SPU) for processing the signals generated by the sensing coils, characterized by:

the sensing coil assembly comprises a plurality of sensing coils; and the SPU includes means for determining over which portion of the coil assembly the piece of metal passes.

2. The invention of claim 1, wherein:

the SPU receives a plurality of coil voltages, one coil voltage for each of the plurality of coils;

the SPU includes means for generating a plurality of difference signals, each difference signal representing a difference between corresponding pairs of the coil voltages;

the SPU includes means for generating a sum signal representing a sum of the difference signals and means for generating a trip signal if the sum signal is greater than a threshold; and the metal detector comprises means for stopping the rotatable machine elements in response to the trip signal.

3. The invention of claim 1, wherein:

the SPU receives a plurality of coil voltages, one coil voltage for each of the plurality of coils;

the SPU includes means for generating a plurality of difference signals, each difference signal representing a difference between corresponding pairs of the coil voltages;

the SPU includes means for generating a sum signal representing a sum of the absolute values of all the difference signals and means for generating a trip signal if the sum signal is greater than a threshold; and the metal detector comprises means for stopping the rotatable machine elements in response to the trip signal.

4. The invention of claim 1, wherein:

the SPU receives a plurality of coil voltages, one coil voltage for each of the plurality of coils;

the SPU includes means for generating a plurality of difference signals, each difference signal representing a difference between corresponding pairs of the coil voltages; and the SPU includes means for determining over which portion of the coil assembly the piece of metal passes by comparing one of the difference signals to a threshold.

5. The invention of claim 4, wherein:

the SPU includes means for determining over which side of the coil assembly the piece of metal passes by comparing to a threshold the difference signal corresponding to a difference between the voltages from non-adjacent coils.

6. The invention of claim 4, wherein:

the SPU includes means for determining over which side of the coil assembly the piece of metal passes by comparing to a threshold the difference signal corresponding to a difference between the voltages from coils at opposite ends of the coil assembly.

7. The invention of claim 4, wherein:

the SPU includes means for more precisely determining the position of the piece of metal passes by comparing one of the difference signals to another one of the difference signals.

8. The invention of claim 1, wherein:

the sensing coil assembly comprises three sensing coils electrically connected together in a three-phase "Y" arrangement.

9. In a metal detector for sensing presence of metal in material flowing past rotatable machine elements in a harvesting machine, the metal detector being mounted inside a rotating feed roll of the harvesting machine, the metal detector having magnets for generating a magnetic field which extends into a path of the material, a sensing coil assembly for generating electrical signals when the magnetic field is altered by the presence of a piece of metal and a signal processing unit (SPU) for processing the signals generated by the sensing coils, characterized by:

the sensing coil assembly comprises at least three sensing coils; and the SPU includes means for determining over which portion of the coil assembly the piece of metal passes.

10. The invention of claim 9, wherein:

the sensing coil assembly comprises three sensing coils electrically connected together in a three-phase "Y" arrangement.

11. The invention of claim 9, wherein:

the SPU receives a first coil voltage V(x), a second coil voltage V(y) and a third coil voltage V(z);

the SPU includes means for generating a first difference signal V(X–Y) representing a difference between V(x) and V(y), a second difference signal V(Y–Z) representing a difference between V(y) and V(z) and a third difference signal V(Z–X) representing a difference between V(z) and V(x); and the SPU includes means for determining over which portion of the coil assembly the piece of metal passes by comparing one of the difference signals to a threshold and by comparing one of the difference signals to another of the difference signals.

12. The invention of claim 11, wherein:

the SPU includes means for generating a sum signal representing a sum of the difference signals, means for generating a trip signal if the sum signal is greater than a threshold; and the metal detector comprises means for stopping the rotatable machine elements in response to a trip signal.

13. The invention of claim 11, wherein:

the SPU includes means for generating a sum signal representing a sum of the absolute values of all the difference signals and means for generating a trip signal if the sum signal is greater than a threshold; and the metal detector comprises means for stopping the rotatable machine elements in response to the trip signal.

14. The invention of claim 11, wherein:

the SPU includes means for determining over which side of the coil assembly the piece of metal passes by comparing to a threshold the difference signal corresponding to a difference between the voltages from coils at opposite ends of the coil assembly.

15. In a metal detector for sensing presence of metal in material flowing past rotatable machine elements in a harvesting machine, the metal detector having magnets for generating a magnetic field which extends into a path of the material, a sensing coil assembly for generating electrical signals when the magnetic field is altered by the presence of a piece of metal, a signal processing unit (SPU) for processing the signals generated by the sensing coils, characterized by:

- the sensing coil assembly comprises three sensing coils, including a pair of end coils and a central coil located between the end coils, the coils being electrically connected together in a three-phase "Y" arrangement; and
- a pair of spaced apart bar magnets are mounted within each of the sensing coils at opposite ends thereof, the bar magnets at outer ends of the end coils being stronger than the other bar magnets.

16. The invention of claim 15, wherein:

- the bar magnets at outer ends of the end coils are approximately 50% stronger than the other bar magnets.

17. In a metal detector for sensing presence of metal in material flowing past rotatable machine elements in a harvesting machine, the metal detector having magnets for generating a magnetic field which extends into a path of the material, a sensing coil assembly for generating electrical signals when the magnetic field is altered by the presence of a piece of metal, a signal processing unit (SPU) for processing the signals generated by the sensing coils, characterized by:

- the sensing coil assembly comprises at least three sensing coils, including a pair of end coils at opposite ends of the assembly, the coils having like polarity ends being electrically connected together; and
- a pair of spaced apart bar magnets are mounted within each of the sensing coils at opposite ends thereof, the bar magnets at outer ends of the end coils being stronger than the other bar magnets.

18. The invention of claim 17, wherein:

- the bar magnets at outer ends of the end coils are approximately 50% stronger than the other bar magnets.

* * * * *

UNITED STATES PATENT AND TRADEMARK OFFICE
CERTIFICATE OF CORRECTION

PATENT NO. : 5,504,428
DATED : April 2, 1996
INVENTOR(S) : Stanley J. Johnson

It is certified that error appears in the above-indentified patent and that said Letters Patent is hereby corrected as shown below:

Title page, line 2 of the title, delete "Harristing" and insert --Harvesting--.

Column 1, line 2, delete "Harristing" and insert --Harvesting--.

Signed and Sealed this

Fifth Day of November, 1996

Attest:

BRUCE LEHMAN

Attesting Officer          Commissioner of Patents and Trademarks